United States Patent
Gassner et al.

(10) Patent No.: US 6,588,256 B2
(45) Date of Patent: Jul. 8, 2003

(54) METHOD AND DEVICE FOR DETERMINING TORQUE SETPOINT VALUES FOR A MOTOR VEHICLE HAVING AT LEAST TWO DRIVE ASSEMBLIES

(75) Inventors: Friedrich Gassner, Regensburg (DE); Georg Grassl, Hainsacker (DE); Florian Gutknecht-Stöhr, Regensburg (DE); Gregor Probst, Landshut (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/923,705

(22) Filed: Aug. 6, 2001

(65) Prior Publication Data

US 2002/0029624 A1 Mar. 14, 2002

(30) Foreign Application Priority Data

Aug. 4, 2000 (DE) .......................................... 100 38 181

(51) Int. Cl.⁷ ............................................. G01M 13/00
(52) U.S. Cl. .......................................... 73/116; 73/862
(58) Field of Search ...................... 73/862.17, 862.333, 73/116, 862, 862.08, 862.09; 123/192.1, 339.16, 325, 352, 339.19, 339.14, 53.1

(56) References Cited

U.S. PATENT DOCUMENTS 4,335,429 A * 6/1982 Kawakatsu ................. 364/424
6,148,784 A * 11/2000 Masberg et al. ......... 123/192.1

FOREIGN PATENT DOCUMENTS

| DE | 196 12 455 A1 | 10/1997 |
| EP | 0 901 930 A1 | 3/1999 |
| JP | 01 012 610 A | 1/1989 |
| WO | PCT/DE99/01334 | 12/1999 |

* cited by examiner

Primary Examiner—Vinh P. Nguyen
Assistant Examiner—Monica D. Harrison
(74) Attorney, Agent, or Firm—Laurence A. Greenberg; Werner H. Stemer; Ralph E. Locher

(57) ABSTRACT

A method of determining setpoint values in motor vehicles that have at least two drive assemblies. Torque setpoint values are determined in separate evaluation branches for each of the drive assemblies as a function of a variable that characterizes the driver's requirement and as a function of operating variables of the motor vehicle. The specific strengths and weaknesses of the respective drive assembly are taken into account directly in the respective evaluation branch.

6 Claims, 2 Drawing Sheets

METHOD AND DEVICE FOR DETERMINING TORQUE SETPOINT VALUES FOR A MOTOR VEHICLE HAVING AT LEAST TWO DRIVE ASSEMBLIES

BACKGROUND OF THE INVENTION

Field of the Invention

The invention relates to a method and to a device for determining torque setpoint values for a motor vehicle having at least two drive assemblies.

Future generations of vehicles will be equipped not only with a conventional internal combustion engine but increasingly also with at least one additional drive assembly, such as a crankshaft starter generator, also referred to below as an integrated starter generator (ISG). A method for controlling a power engine, which includes an internal combustion engine and a crankshaft starter generator, is known from International Publication WO 99/62735. A setpoint value of a torque is determined as a function of the position of the accelerator pedal, the rotational speed and a torque loss. In this torque loss, losses are taken into account as a function of further operating variables such as the air mass flow rate, the coolant temperature, the oil temperature, the current through the crankshaft starter generator and the temperature of the crankshaft starter generator. The air mass flow rate is set based upon a setpoint torque and is also based upon a setpoint torque that is derived from action values of the torque that are needed in functional units for controlling the internal combustion engine such as a traction controller, a rotational speed limiter, a speed limiter or a catalytic converter heating function unit. In addition, a setpoint value of the torque which is to be set within a predefined time period is determined as a function of the setpoint torque and the torque requirements of the other functions. The crankshaft starter generator and the ignition are then actuated as a function of this torque setpoint value which is to be set quickly.

In this method, the additional drive assembly in the form of the crankshaft starter generator is used to implement the torque requested by the driver by activating the accelerator pedal, but during the conversion of the accelerator pedal position into a setpoint torque, only the loss torque of the crankshaft starter generator is taken into account. The possibility of generating an additional torque using the crankshaft starter generator is not taken into account.

SUMMARY OF THE INVENTION

It is accordingly an object of the invention to provide a method and a device for determining torque setpoint values for motor vehicles having at least two drive assemblies, which overcomes the above-mentioned disadvantageous of the prior art apparatus and methods of this general type. In particular, it is an object of the invention to provide a method and a device for determining torque setpoint values for motor vehicles having at least two drive assemblies by means of which the characteristic strengths and weaknesses of the individual drive assemblies are taken into account directly during the conversion of a variable which characterizes the driver's requirement into torque setpoint values.

With the foregoing and other objects in view there is provided, in accordance with the invention, a method for determining torque setpoint values for a motor vehicle having at least two drive assemblies. The method includes steps of: providing a motor vehicle having at least two drive assemblies; providing the motor vehicle with a device for sensing a variable that characterizes a driver's requirement; providing the motor vehicle with a device for sensing operating variables of the motor vehicle; providing a separate evaluation branch for each one of the at least two drive assemblies; determining a respective torque setpoint value in each one of the at least two separate evaluation branches; and determining each respective torque setpoint value as a function of the variable that characterizes the driver's requirement and as a function of the operating variables of the motor vehicle.

In accordance with an added mode of the invention, the method includes steps of: providing at least one of the at least two drive assemblies as an electric motor; deriving a torque factor for the electric motor from the variable that characterizes the driver's requirement and as a function of a driver type and/or a charge state of a vehicle battery; and determining an electric motor torque setpoint value from the torque factor for the electric motor and from a rotational speed, the electric motor torque setpoint value defining the torque setpoint value in one of the at least two separate evaluation branches.

In accordance with an additional mode of the invention, the torque factor deriving step is performed by deriving the torque factor for the electric motor in dependence on a gradient of the variable that characterizes the driver's requirement.

In accordance with another mode of the invention, the torque factor deriving step is performed by deriving the torque factor for the electric motor in dependence on an integral over the variable that characterizes the driver's requirement.

With the foregoing and other objects in view there is also provided, in accordance with the invention, a device for determining torque setpoint values for a motor vehicle having at least two drive assemblies. The device includes means for determining a torque setpoint value, for each one of at least two drive assemblies, as a function of a variable that characterizes a driver's requirement and as a function of operating variables of a motor vehicle. The means may be a determination device, for example, a processor.

In accordance with an added feature of the invention, the means is configured to determine the torque setpoint values for individual ones of the drive assemblies in evaluation branches that are separate from one another.

In other words, in motor vehicles having at least two drive assemblies, torque setpoint values are determined for each of the drive assemblies in separate evaluation branches as a function of a variable which characterizes the driver's requirement and as a function of operating variables of the motor vehicle. Here, the specific strengths and weaknesses of the respective drive assembly are taken into account directly in the respective evaluation branch so that the overall torque setpoint value which results from the sum of the individual torque setpoint values always represents the maximum possible torque under the operating conditions of the motor vehicle applying at a given moment.

In one preferred embodiment, at least one of the drive assemblies is embodied as an electric motor. The torque setpoint value for the electric motor is determined from a torque factor for the electric motor and from the rotational speed. The torque factor for the electric motor is derived from the variable which characterizes the driver's requirement, as a function of the driver type and/or the charge state of a vehicle battery. The term electric motor is to be understood here and below in a general sense and also includes crankshaft starter generators which are preferably embodied as asynchronous machines, but which also may be embodied as synchronous machines or as d.c. motors.

Other features which are considered as characteristic for the invention are set forth in the appended claims.

Although the invention is illustrated and described herein as embodied in a method and device for determining torque setpoint values for drive assemblies of motor vehicles having at least two drive assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
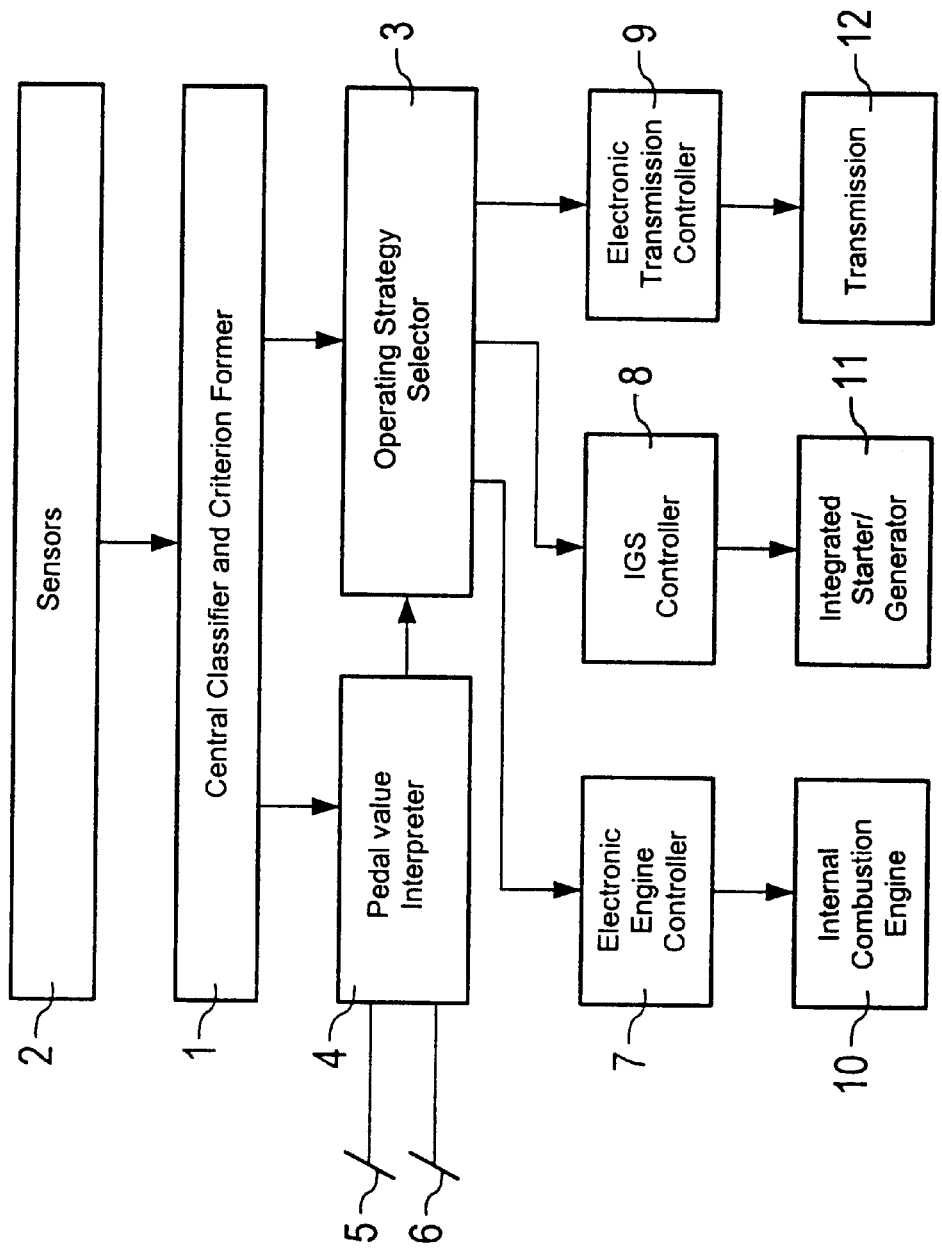
FIG. 1 shows a schematic view of the hierarchical structure of the control units of a drive train that includes an internal combustion engine and a crankshaft starter generator.

Referring now to the figures of the drawing in detail and first, particularly, to FIG. 1 thereof, there is shown a drive train controller. The components of the drive train controller are described below. For the sake of clarity, the designations "circuit" or "block" are frequently dispensed with below in discussing the individual circuit or program components.

Data from sensors 2, which are combined symbolically to form a block, are fed via respective signal lines to a central classifier and criteria former 1. The signal lines can be embodied as a data bus, for example a CAN (Controller area Network) bus. In the central classifier and criteria former 1, output signals, which characterize the operating situation, are generated as a function of the sensor signals and possibly as a function of further data from external signal sources such as, for example, via GPS (Global Positioning Satellites). In particular, the central classifier and criteria former 1 can have, for example, the following components: a driver type determiner, an environment and street type localizer, a driving maneuver and driving situation detector and an information channel, for example a radio telephone or a satellite receiver. The output signals of the circuit components mentioned above are transmitted to an operating strategy selector 3 and to a pedal value interpreter 4. The latter also receives signals from a brake pedal 5 and from an accelerator pedal 6. The function and method of operation of the pedal value interpreter 4 is explained in detail in conjunction with the description of FIG. 2. The operating strategy selector 3 acts as a central "decider" and defines the operating strategy of the entire drive train. The operating strategy selector 3 passes on respective control signals to decentralized control units such as, an electronic engine controller (EMS) 7, ISG controller (ISGS) 8 and electronic transmission controller (EGS) 9. If, for example, a driving mode with minimized emission is defined, then all of the control units 7 to 9 are operated in such a way that the emission of pollutants is minimized. Analogously, in a mode which is oriented toward driving performance, the output variables of all of the control units 7 to 9 are set in such a way that the best possible acceleration is ensured and also so that, in response to the driver's requirement (unrestricted driving mode), the drive has a rapid response. Information relating to driving maneuvers, such as cornering or overrun mode, can also be evaluated in the operating strategy selector 3. As a consequence, for example, during extreme cornering, the transmission ratio can be fixed (EGS) and the load change in the drive can be damped or slowed down (EMS). The decentralized control units 7–9 generate adjustment signals with which the individual assemblies—the internal combustion engine 10, the integrated starter/generator ISG 11 and the transmission 12—or even further components of the drive train are controlled.

The sensors 2 supply necessary signals both for the central classifier and criteria former 1 and for the pedal value interpreter 4 and also for the decentralized control units 7 to 9. For reasons of clarity, however, only the signal connection to the central classifier and criteria former 1 is illustrated in FIG. 1. The localization of the sensors 2 with respect to the function blocks plays a subordinate role provided that communication between the sensor signal conditioner in the respective control unit and the information sink is ensured. In terms of the functional architecture, the actual functional units can be physically present and combined in the control units in any workable manner—the choice is insignificant. The individual functional units of the central classifier and criteria former 1 and the accelerator pedal interpreter 4 can thus be integrated into one of the decentralized control units 7 to 9 without affecting the overall control function. Likewise, individual control functions of the decentralized control units 7–9 can also be combined in a superordinate control unit, for example a combined engine and transmission control unit.

Figure 2:
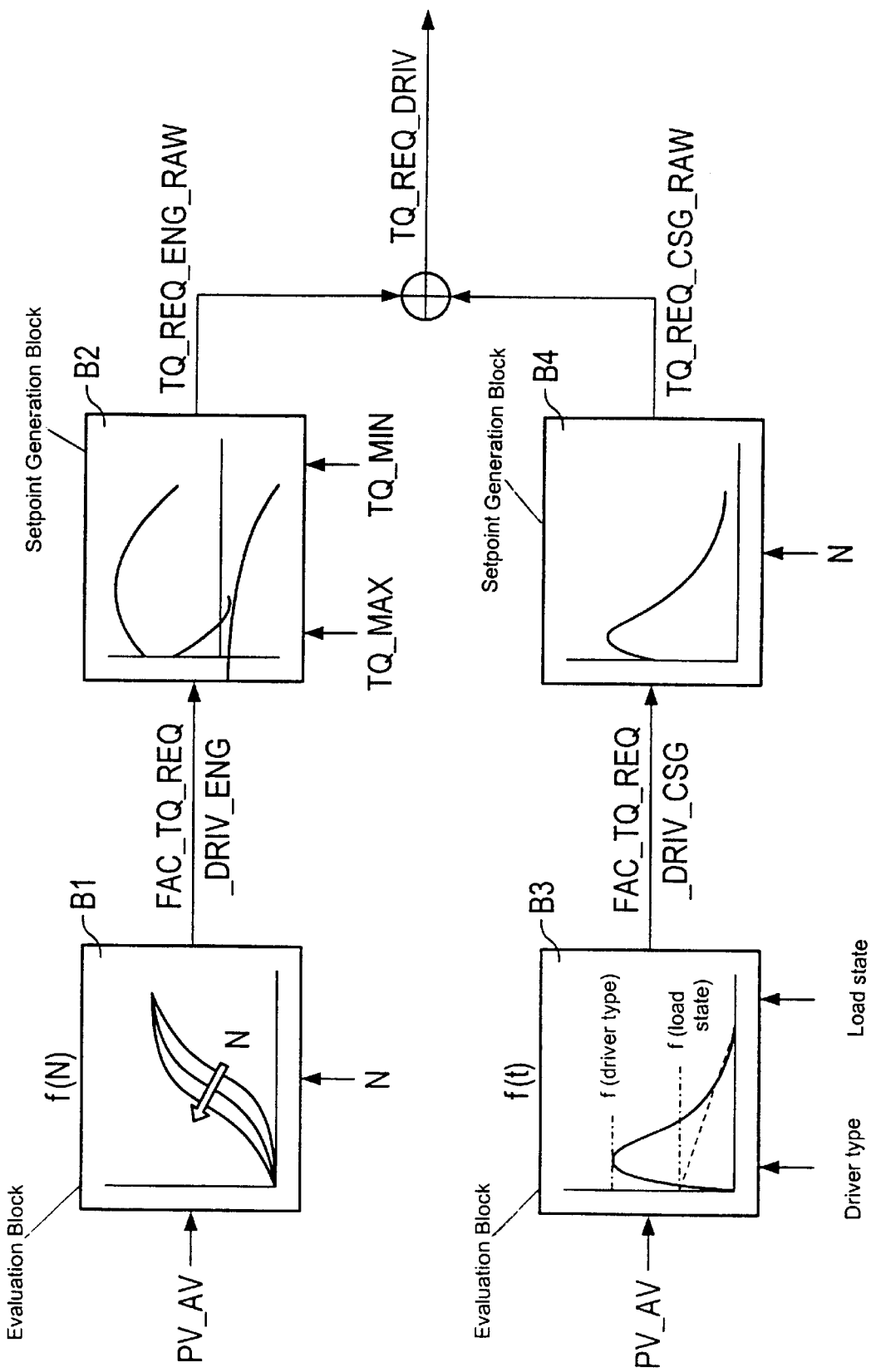
FIG. 2 shows a block circuit diagram of a device for determining the torque setpoint values.

FIG. 2 is a block circuit diagram showing the function of the accelerator pedal value interpreter 4. The conversion of a pedal value into torque setpoint values for a motor vehicle with two drive assemblies is illustrated, by way of example, in which the two drive assemblies are provided in the form of an internal combustion engine and a crankshaft starter generator—which itself is provided as a special form of an electromotor. The pedal value represents the position of the accelerator pedal or the pressure exerted on the accelerator pedal and is thus to be seen as an example of a variable which characterizes the driver's requirement. The physical conversion of the driver's requirement into a characteristic variable is irrelevant to the idea of the invention, so that the variable which characterizes the driver's requirement can also be predefined by a travel speed regulator. The torque setpoint values can be related both to the engine torque and to the wheel torque, that is to say the torque which is to be transmitted from the drive wheels to the carriageway. Activations of the brake pedal can then be interpreted, for example, as a desired negative wheel torque.

In a first evaluation branch, a first torque factor FAC_TQ_REQ_DRIV_ENG is formed (FIG. 2) in an evaluation block B1 as a function of the pedal value PV_AV and the rotational speed N. This first torque factor constitutes a dimensionless variable with a value range varying between 0 and 1. A first torque setpoint TQ_REQ_ENG_RAW for the internal combustion engine is generated from this first torque factor in a block B2 as a function of a maximum torque TQ_MAX and a minimum torque TQ_MIN. To do this, in the simplest case, the first torque factor FAC_TQ_REQ_DRIV_ENG is multiplied by the difference between the maximum and minimum torque. The maximum torque TQ_MAX and the minimum torque TQ_MIN here constitute computational values, as do all of the other variables in the block circuit diagram, and correspond to the maximum or minimum torque which can be made available at a clutch at the output of the internal combustion engine.

In parallel with the determination of the first torque setpoint value TQ_REQ_ENG_RAW for the internal combustion engine, a second torque factor FAC_TQ_REQ_DRIV_CSG for the integrated starter/generator ISG is formed in a second evaluation branch in an evaluation block B3 as a function of the pedal value PV_AV, the driver type and/or the charge state of the vehicle battery. This torque factor also constitutes a dimensionless variable with a value range varying between 0 and 1. In addition to the driver type and the charge state of the battery, further system variables, such as the load state or the engine operating state for example, can also be taken into account in the definition of the second torque factor. What is decisive is that the strengths and weaknesses of the respective driver assembly, in this case therefore of the integrated starter/generator ISG, are taken into account as comprehensively as possible in the evaluation block of the associated evaluation branch. In the case of the integrated starter/generator ISG, in particular the rapid response time, but also the limited battery capacity are to be taken into account here. This state can be allowed for, for example, by overproportionally weighting the gradient of the pedal value PV_AV in the evaluation function of the evaluation block B3 and returning the torque factor to the value 0 using an integral over the pedal value PV_AV. A possible evaluation function for the evaluation block B3 of the evaluation branch for the integrated starter/generator ISG could therefore be:

$$f(t)=n*[a(\text{driver type})*d/dt(PV\_AV)++b*PV\_AV++c(\text{load state})*int(PV\_AV)dt]$$

where a is a variable which is dependent on the driver type, b is a constant, c is a variable which is dependent on the load state of the vehicle battery, and n is a scaling factor In a block B4, a second torque setpoint value TQ_REQ_CSG_RAW for the integrated starter/generator ISG is generated as a function of the second torque factor FAC_TQ_REQ_DRIV_CSG and of the rotational speed N.

The torque setpoint values for the individual drive assemblies can then either be passed on directly to the respective decentralized control units, in the exemplary embodiment therefore to the EMS 7 and the ISGS 8, or can first be added to form a composite torque setpoint value TQ_REQ_DRIV and then be further processed in the operating strategy selector 3. This provides the additional possibility of setting the torque distribution under certain operating conditions in such a way that it deviates from the individual torque setpoint values which are determined, in order for example to avoid the operation of the internal combustion engine in an unfavorable partial load range.

The invention has been presented by way of example for a motor vehicle having two drive assemblies in the form of an internal combustion engine and a crankshaft starter generator. The crankshaft starter generator, which performs on the one hand the function of a starter with downstream transmission and on the other hand the function of a dynamo, separate from it, for charging the vehicle battery, is to be considered here simply as a special form of an electric motor. The use of the invention is however not restricted in any way by the type of drive assemblies. The invention can also be applied for motor vehicles with more than two drive assemblies.

We claim:

1. A method for determining torque setpoint values for a motor vehicle having at least two drive assemblies, the method which comprises:

providing a motor vehicle having at least two drive assemblies;

providing the motor vehicle with a device for sensing a variable that characterizes a driver's requirement;

providing the motor vehicles with a device for sensing operating variables of the motor vehicle;

providing a separate evaluation branch for each one of the at least two drive assemblies;

determining a respective torque setpoint value in each one of the at least two separate evaluation branches; and determining each respective torque setpoint value as a function of the variable that characterizes the driver's requirement and as a function of the operating variables of the motor vehicle.

2. The method according to claim 1, which comprises:

providing at least one of the at least two drive assemblies as an electric motor;

deriving a torque factor for the electric motor from the variable that characterizes the driver's requirement and as a function of an aspect selected from the group consisting of a driver type and a charge state of a vehicle battery; and determining an electric motor torque setpoint value from the torque factor for the electric motor and from a rotational speed, the electric motor torque setpoint value defining the torque setpoint value in one of the at least two separate evaluation branches.

3. The method according to claim 2, which comprises performing the torque factor deriving step by deriving the torque factor for the electric motor in dependence on a gradient of the variable that characterizes the driver's requirement.

4. The method according to claim 3, which comprises performing the torque factor deriving step by deriving the torque factor for the electric motor in dependence on an integral over the variable that characterizes the driver's requirement.

5. The method according to claim 2, which comprises performing the torque factor deriving step by deriving the torque factor for the electric motor in dependence on an integral over the variable that characterizes the driver's requirement.

6. A device for determining torque setpoint values for a motor vehicle having at least two drive assemblies, comprising:

a first evaluation branch including a first means for determining a torque setpoint value for a first drive assembly as a function of a variable characterizing a driver's requirement and as a function of operating variables of a motor vehicle; and a second evaluation branch including a second means for determining a torque setpoint value for a second drive assembly as a function of a variable characterizing a driver's requirement and as a function of operating variables of a motor vehicle;

said first evaluation branch being separate from said second evaluation branch.

* * * * *